(12) United States Patent
Bortoloso et al.

(10) Patent No.: US 9,552,194 B2
(45) Date of Patent: Jan. 24, 2017

(54) SYSTEM AND METHOD FOR CREATING A GRAPHICAL USER INTERFACE WITHIN A MANUFACTURING EXECUTION SYSTEM

(71) Applicant: SIEMENS AKTIENGESELLSCHAFT, Munich (DE)

(72) Inventors: Luca Bortoloso, Genoa (IT); Stefania Luca, Genoa (IT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/290,319

(22) Filed: May 29, 2014

(65) Prior Publication Data

US 2014/0359570 A1    Dec. 4, 2014

(30) Foreign Application Priority Data

May 30, 2013  (EP) .................................... 13169920

(51) Int. Cl.
*G06F 9/44* (2006.01)
*G05B 19/409* (2006.01)

(52) U.S. Cl.
CPC ............. *G06F 8/38* (2013.01); *G05B 19/409* (2013.01); *G05B 2219/32128* (2013.01);
(Continued)

(58) Field of Classification Search
CPC ............................................. G06F 8/29–8/34
(Continued)

(56) References Cited

U.S. PATENT DOCUMENTS 5,367,624 A * 11/1994 Cooper .................. G06Q 10/06
                                                      715/734
5,805,442 A *  9/1998 Crater ................ G05B 19/4185
                                                       340/3.7
(Continued)

FOREIGN PATENT DOCUMENTS

EP         2040204 A1    3/2009
WO         0223336 A1    3/2002

OTHER PUBLICATIONS

Anonymous: "Microsoft Access", Wikipedia, Apr. 24, 2013, XP055205470, retrieved from the Internet: URL:https://en.wikipedia.org/w/index.php?title=Microsoft_Access&oldid=551919076.

*Primary Examiner* — Matthew Brophy
(74) *Attorney, Agent, or Firm* — Laurence Greenberg; Werner Stemer; Ralph Locher (57) ABSTRACT

A graphical user interface for a manufacturing execution system (MES) wherein a client application builder tool (CAB) enables a user to display MES screens and customize MES applications and/or proprietary applications. A MES database contains required data stemming from a production process to be displayed on the MES screens. Specification data are determined in a configuration file with a meta-data fixed structure enabling the generation of a configuration interface. A dynamically built and WEB-technology based GUI configuration tool is executed, calling the specification data and offering the user the configuration interface within the GUI configuration tool to create the GUI according to the specification data. The configuration interface is generated by using the meta-data fixed structure. The graphical user interface is created according to data entries made to the configuration interface. The data from the MES database are filled into the respective data fields, creating the MES screens.

10 Claims, 4 Drawing Sheets (52) U.S. Cl.
CPC .............. *G06F 8/71* (2013.01); *Y02P 90/12* (2015.11); *Y02P 90/20* (2015.11); *Y02P 90/22* (2015.11)

(58) Field of Classification Search
USPC ..................... 717/100–105; 715/762–862
See application file for complete search history.

(56) References Cited

U.S. PATENT DOCUMENTS

| | | | |
|---|---|---|---|
| 6,823,495 B1* | 11/2004 | Vedula | G06F 8/34 715/763 |
| 7,092,778 B2* | 8/2006 | Huang | G05B 19/418 700/105 |
| 7,386,835 B1 | 6/2008 | Desai | |
| 7,571,426 B2 | 8/2009 | Carroll | |
| 8,032,243 B2 | 10/2011 | Raviola | |
| 8,341,596 B2* | 12/2012 | Peretti | 717/109 |
| 2002/0154159 A1* | 10/2002 | Day et al. | 345/738 |
| 2003/0063124 A1 | 4/2003 | Melhem | |
| 2004/0056896 A1* | 3/2004 | Doblmayr et al. | 345/769 |
| 2004/0187090 A1* | 9/2004 | Meacham | 717/103 |
| 2005/0188349 A1 | 8/2005 | Bent | |
| 2006/0277026 A1 | 12/2006 | Mann et al. | |
| 2008/0294279 A1 | 11/2008 | Tiozzo | |
| 2009/0228783 A1* | 9/2009 | Noferi et al. | 715/234 |
| 2009/0259961 A1* | 10/2009 | Bakli et al. | 715/772 |
| 2010/0070890 A1* | 3/2010 | Axt et al. | 715/762 |
| 2010/0250568 A1* | 9/2010 | Giusti | 707/758 |
| 2012/0109353 A1* | 5/2012 | Boero et al. | 700/104 |
| 2014/0359570 A1* | 12/2014 | Bortoloso | G06F 8/38 717/109 |

\* cited by examiner

| Working Times | | | | | | |
|---|---|---|---|---|---|---|
| ☐ Filter enabled ☐ | | | | | | |
| ID | Label | WorkStart | WorkEnd | CopyBefore | DayAfter | Ty |
| ⇨ Afternoon Time | Afternoon Time | 1:00 PM | 9:00 PM | ☐ | ☐ | Aft |
| ⇨ OIUIHOB | OIUIHOB | 5:35 PM | 5:35 PM | | | |
| ⇨ wrgwg 20 | wrgwg | 6:16 PM | 6:16 PM | | | ak |
| ⇨ hj | chk | 11:00 PM | 11:00 PM | | | |
| ⇨ new | new2 | 11:00 PM | 11:00 PM | | | |
| ⇨ c | cc | 8:00 AM | 11:00 PM | | | |
| ⇨ ppp | ppp | 7:00 AM | 11:00 PM | | | |
| ⇨ to edit | to edit | 7:00 AM | 5:00 PM | | | |
| ⇨ insert break | insert break | 10:00 AM | 6:00 PM | | | tip |
| ⇨ e 231546597123564697123564897132564897564 | e | 11:00 AM | 11:00 PM | | | tip |

1 <u>2</u> 3

| Working Time Details | |
|---|---|
| ID | Afternoon Time |
| Label | Afternoon Time |
| WorkStart | 1:00 PM |
| WorkEnd | 9:00 PM |
| DayAfter | ☐ |
| DayBefore | ☐ |
| Description | Afternoon Time eng |
| Type | Afternoon Time type |
| Colour | 205,205,205 |
| LastDate | 7/23/2007 10:37:27 AM |
| LastUser | manager |
| LastProg | SHC Manager |

Edit New Delete

FIG 3

| Working Time Details | Breaks | | | | |
|---|---|---|---|---|---|
| | ID | Label | StartTime | EndTime | Type |
| | ⇨ Dinner Break | Dinner Break | 7:00 PM | 7:30 PM | Dinner Break type |

| Break Detail | |
|---|---|
| ID | Dinner Break |
| Label | Dinner Break |
| StartTime | 7:00 PM |
| EndTime | 7:30 PM |
| Description | Dinner Break eng |
| Type | Dinner Break type |
| Colour | 205,205,205 |
| LastDate | 7/23/2007 10:37:45 AM |
| LastUser | manager |
| LastProg | SHC Manager |
| Edit New Delete | |

FIG 4

SYSTEM AND METHOD FOR CREATING A GRAPHICAL USER INTERFACE WITHIN A MANUFACTURING EXECUTION SYSTEM

CROSS-REFERENCE TO RELATED APPLICATION

This application claims the priority, under 35 U.S.C. §119, of European patent application EP 13 169 920.9, filed May 30, 2013; the prior application is herewith incorporated by reference in its entirety.

BACKGROUND OF THE INVENTION

Field of the Invention

The present invention relates to a system and a method for creating a graphical user interface within a manufacturing execution system (MES).

In the world of industrial automation of today, in order to increase competitiveness, manufacturing companies need to simultaneously reduce time-to-market, increase process visibility and production flexibility, optimize forecasting and scheduling, and reduce scrap, stock levels and downtimes; all while ensuring optimal quality and production efficiency across all global facilities.

In order to meet these demanding goals, manufacturing companies require an integrated IT infrastructure that helps them in coordinating production on a global scale and, if necessary, in real time. The Manufacturing Execution System (MES) is generally known as the IT layer that integrates the business systems (e.g. ERP, enterprise resource planning) and production control systems.

Siemens Aktiengesellschaft (Siemens Corp.), the applicant herein, offers a broad range of MES products under its SIMATIC® IT product family.

As defined by the Manufacturing Enterprise Solutions Association (MESA International), the MES system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication." The international standard for developing MES systems is commonly referred to as ISA-95 or S95.

The functions that a MES system usually includes are resource allocation and status, dispatching production orders, data collection/acquisition, quality management, maintenance management, performance analysis, operations/detail scheduling, document control, labor management, process management and product tracking.

Thus, the goal of MES systems developed by software suppliers is to provide manufacturing companies (the customers) with tools for measuring and controlling production activities with the aim of boosting profitability, increasing productivity, improving quality and process performance to manufacturing plants.

As used herein, a software application is a set of software components developed by software developers to perform some useful actions within a MES system, e.g. monitoring values coming from plant process or controlling a plant device.

Typically, at engineering or configuration time, system engineers flexibly customize MES applications according to the specific manufacturing plant requirements.

Instead, at runtime, MES applications are utilized by end-users who may be plant operators or line responsible personnel.

MES systems are provided with front-end/client GUI applications which may be used by end-users to plan and control manufacturing activities.

MES GUI applications play a key role in bringing together process, quality and business information from various sources into one unified real-time view of the production status of the plant. In fact, MES GUI applications display to the end-user graphical screens (MES screens) which enable overview several parameters or scenarios of the plant activities.

Nowadays MES screens are mostly developed in the form of web-pages.

For example, with MES application suite SIMATIC® IT, a Client Application Builder (CAB) is provided which is composed of a set of modules allowing users to build customized GUI screen-pages. SIMATIC® IT CAB is a development platform based on .Net technology. For the development of the project Microsoft Visual Studio.Net has to be used. CAB already provides some predefined libraries and tools for the communication with all the SIMATIC IT components. CAB provides MES Graphic User Interface. Therefore, it participates in every action of the Execution of the production schedule. CAB is composed of a set of modules, which allow the user to build GUIs (fully integrated with SIMATIC IT Production Suite) in a Web application and display the Web pages in a Web Browser. It collects data from heterogeneous sources, manipulates and aggregates these data before visualization. SIMATIC IT data are natively integrated, while the standard environment enables integration with virtually every source. CAB offers full Zero Administration Cost (ZAC) capabilities as graphic controls and/or additional files are automatically downloaded and installed by Internet Explorer, therefore every PC on the intranet with Internet Explorer on board can be a SIMATIC IT CAB client. In this case, the CAB environment (CAB Server, CAB Webserver) is placed on a special CAB machine. By calling the Internet Explorer of the OS machine, there will be a connection to the CAB machine to start the web project inside the OS environment.

Typically, software suppliers develop a MES software-product as a general purpose solution to meet several and different customer requirements. As a consequence to it, also the collections of MES screens, which are supplied with the MES product, are designed to be general purpose in order to be used in various different situations.

However, since customers require that MES products be customized for a specific project fitting their specific needs, also the GUIs of MES screens need to be customized in order to satisfy the customer requirements of the specific project. This customer need is a fundamental one since the end-users, at the customer site, interact with the MES product mainly through the GUI of the MES-screens.

Hence, some enhancement needs of MES customers have to be fulfilled on the specific single project, so that the effectiveness and the usability of the MES solution are improved.

A first enhancement need of MES customers regards the way data are inputted. For example, some MES customers prefer to input a particular data through a simple textbox and some other customers prefer to input the same data through a combo box that is already pre-filled with a set of values. Or in another simplified example, some customers wish to be notified that the data input in a field is wrong through an asterisk, other customers wish that the notification of an error occurs via a change of the background color of the input field. In more advanced scenarios, MES end-user require that the gathering of the input data is done through external sources that need custom interface, such as custom browsers or charts.

A second enhancement need of MES customers regards the customization of the master-detail view. In fact, MES screens are very often designed with a master-detail view: i.e. a grid or tree represents the main entity of the screen page and through the selection of a specific item; its details are shown.

Unfortunately, the details that each customer wants to see are often different and specific for a specific factory requirement. These details are usually related to a "master" entity in the page. Typically, the detail information can be viewed through a panel control or alternatively can be logically grouped through a tab control in different tab-panels.

There are three typical technical requirements that need to be met in MES screens designed with the master/details view.

A first typical technical requirement is to hide some details that were defined in the general purpose screen of the MES product.

A second technical requirement is to add some additional details that were not defined in the general purpose screen of the product.

A third technical requirement is to contextualize the added details so that they are aware of the original page and they behave accordingly.

Finally, the added controls cannot work correctly without being aware of the original. Hence, it is seen that, since different MES customers have different requirements, different types of customizations are needed.

In the art, the customization problem of MES screen has been solved in two ways.

According to a first solution, the source codes of the screens are delivered to the system engineers or to the system integrators that modify them according to the required customizations. This action has relevant cost impacts in terms of required time and efforts. In addition, another drawback is that the proprietary source code is exposed to third parties that regularly are not employees of the software developing company with an evident intellectual property problem.

According to a second solution, the screens are developed from scratch by the software developers in order to meet the customer needs. A brand new web-page, in replace of the original one, is to be created containing the required customizations. Unfortunately, this second way has the drawback that it is not possible to develop general-purpose screens but only project-specific ones. The customization is customer-specific: a new modified version of the page is created. This action has a very high effort: effort of time for the analysis of the original page (the person who customize the screen is not usually the same who created it); effort of time to modify the page; effort of time to test the page (also some solid regression test is needed); effort to maintain a different version of the same page for different customers.

Unfortunately, in both prior art options of customizing MES web-screens, the source code of the web-page has to be modified. This fact implies that the source code of the product-delivered screens needs to be completely tested again, with the relevant cost impacts in terms of time and efforts, also taking into account requirements on code maintenance and upgrades.

Moreover, with known methods of customizing MES web-screens, not only the development and customization efforts are increased but also the reusability of the delivered web-screens is reduced.

For example, in known methods of customizing web-screens in order to obtain one of the two above mentioned enhancements, i.e. the customization of the way of inputting data or of the master-detail view, an ASP.NET control (user or custom) is used, hosted on the web-page. However, unfortunately this customization is accomplished by adding and coding an ASP.NET control within the page by having access to the source code of the page with the above described drawbacks.

SUMMARY OF THE INVENTION

It is accordingly an object of the invention to provide a method and a device for generating graphical user interfaces in the context of an MES which overcome the above-mentioned disadvantages of the heretofore-known devices and methods of this general type and which provides for a customized GUI of a MES screen without modifying the source code of the web-screen. Currently, SIMATIC IT configuration tools are usually not based on web technology which makes the development currently rather complicated. Moreover, the loss of time needed when updating the code of a web project is not negligible when data base structures where the configuration data is stored to change. Quite often in projects, if the project schedule might permit it, the GUI development starts some time after the development of the data base so that the data base structure is thoroughly elaborated and the iterations required to adapt the GUI to any data bases changes will diminish. Nevertheless, each change of the data base even at a later state may entail a large number of adaptations with possibly high risks for a waste of time.

It is therefore a further object of the present invention to provide a system and a method with a mechanism within the MES CAB to provide a configuration tool for web projects which does not require the access and the conformity of the related data base where the configuration data for the web project is stored to.

With the foregoing and other objects in view there is provided, in accordance with the invention, a method for creating a graphical user interface within a manufacturing execution system (MES). The method comprises:

a) providing a client application builder tool enabling a user to display MES screens and customize MES applications and/or proprietary applications by use of the graphical user interface, b) providing a MES database comprising required data to be displayed on the MES screens;

c) storing the data stemming from a production process controlled by the manufacturing executions system to the MES data base;

d) determining at least one set of specification data in a configuration file, said set of specification data having a meta-data fixed structure enabling the generation of a configuration interface;

e) executing a dynamically built and WEB technology based GUI configuration tool, wherein the GUI configuration tool calls the specification data in the configuration file and offers the user the configuration interface within said GUI configuration tool in order to create the graphical user interface according to the specification data; and f) generating by use of the meta-data fixed structure the configuration interface;

g) creating the graphical user interface according to data entries made to the configuration interface thereby determining the appearance of the respective data fields in the graphical user interface; and h) filling the data from the MES database into the respective data fields in the graphical user interface thereby creating the MES screens.

With respect to the device, the above-mentioned objects are achieved according to the present invention by a system for creating a graphical user interface within a manufacturing execution system (MES), comprising:

a) a client application builder tool enabling a user to display MES screens and customize MES applications and/or proprietary applications by use of the graphical user interface, b) a MES database comprising required data to be displayed on the MES screens wherein data stemming from a production process controlled by the manufacturing executions system to the MES data base is stored on the MES database;

c) at least one set of specification data in a configuration file, said set of specification data having a meta-data fixed structure enabling the generation of a configuration interface;

d) a dynamically built and WEB technology based GUI configuration tool being executable, wherein the GUI configuration tool calls the specification data in the configuration file and offers the user the configuration interface within said GUI configuration tool in order to create the graphical user interface according to the specification data;

e) means for generating by use of the meta-data fixed structure the configuration interface;

f) creating the graphical user interface according to data entries made to the configuration interface thereby determining the appearance of the respective data fields in the graphical user interface; and g) filling the data from the MES database into the respective data fields in the graphical user interface thereby creating the MES screens.

The present invention therefore allows to create a dynamically built GUI configuration tool in web technology that is completely disconnected from the MES database structure. Since the GUI configuration tool is built dynamically on the meta-data fixed structure, any change on the MES database does not affect the integrity of the GUI which therefore avoids any further manual intervention to align an existing GUI to an amended MES database.

In a preferred embodiment of the present invention, the data fields in the graphical user interface may comprise effective data values from resources contributing to the production process and/or graphs, such as KPI data, and/or drop-down lists and/or user required data entries. Typically, the manufacturing execution system is based on the S-95 standard.

Another preferred embodiment of the present invention may provide for the structure of the graphical user interface being based on the meta-data fixed structure thereby enabling a virtual data link retrieving the data in the MES database to be displayed on the MES screen. This feature effectively decouples the GUI configuration tool from the need to amend the so created GUI every time the structure of the MES database has been amended.

Embodiments of the invention advantageously enable customizations by changing the page configuration through the dynamically built configuration tool so that the source code is not modified.

Embodiments of the invention conveniently lead to cost reductions, for the following reasons:
  Required efforts for customizing the MES web screens are reduced;
  Required maintenance of the software product is reduced;
  The approach is less error prone;
  No need of an exhaustive analysis and of knowledge of the original page design;
  No regression test is needed for the web-page.

The dynamically built configuration tool is therefore enabled according to the meta-data fixed structure for inputting input data in the user-interface of the configuration tool allowing to switch through some pre-defined editors without writing a single line of code. Examples of pre-defined editors may include textbox with custom validation, combobox with items dynamically defined, date pickers and others. The configuration tool therefore further offers:

a) Through the configuration tool it is for example easy to configure which tab panel of the tab controls needs to be shown in the GUI;

b) Through the configuration tool it is for example possible to add new tab panels to the tab control. In addition, if desired, it is possible to configure the content of the added tab panel. This content is formed by custom controls that can contain any graphic elements. Hence, conveniently, information not initially conceived by the page developer can be added on demand. Moreover, these controls can be reused in multiple pages, saving effort and time of development.

c) Finally the added controls cannot work correctly without being aware of the original page. For this reason in the web page has been created a repository containing context information for all the controls of the web page. Each control gives information about its state: for example the grid gives information about the selected record, the filter control about the filter that it is applying, the toolbar about the button that is being clicked, and so on. Using this information, the added control knows the state of the page and they can act consequently: for example they can show information contextualized with the selected record of the grid.

Other features which are considered as characteristic for the invention are set forth in the appended claims.

Although the invention is illustrated and described herein as embodied in a system and a method for creating a graphical user interface within a manufacturing execution system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

A graphical user interface (GUI) of a manufacturing execution system (MES) screen taking into account some specific customer requirements is created by a dynamically built configuration tool. The MES screen comprises at least one configurable graphic control that contains at least one area that can be customized, herein called custom area. The GUI configuration tool enables the configuration of the configurable graphic control GUI in at least one custom area.

The configuration tool according to the present invention is dynamically built. By use of the configuration tool, the information of a developed additional ASP.net control for linking it to the custom area of the configurable graphic control can be specified exemplarily. Examples of such information may be the fully qualified name for custom control or the site relative path for a user control. Advantageously, upon request, parameters can be configured, at engineering time, in order to be sent, at run time, to the additional ASP.net control. Through the configuration tool, it is possible to define for each field of a grid of the GUI which graphical elements/data fields have to be present and/or the specific user wants to see displayed.

Figure 1:
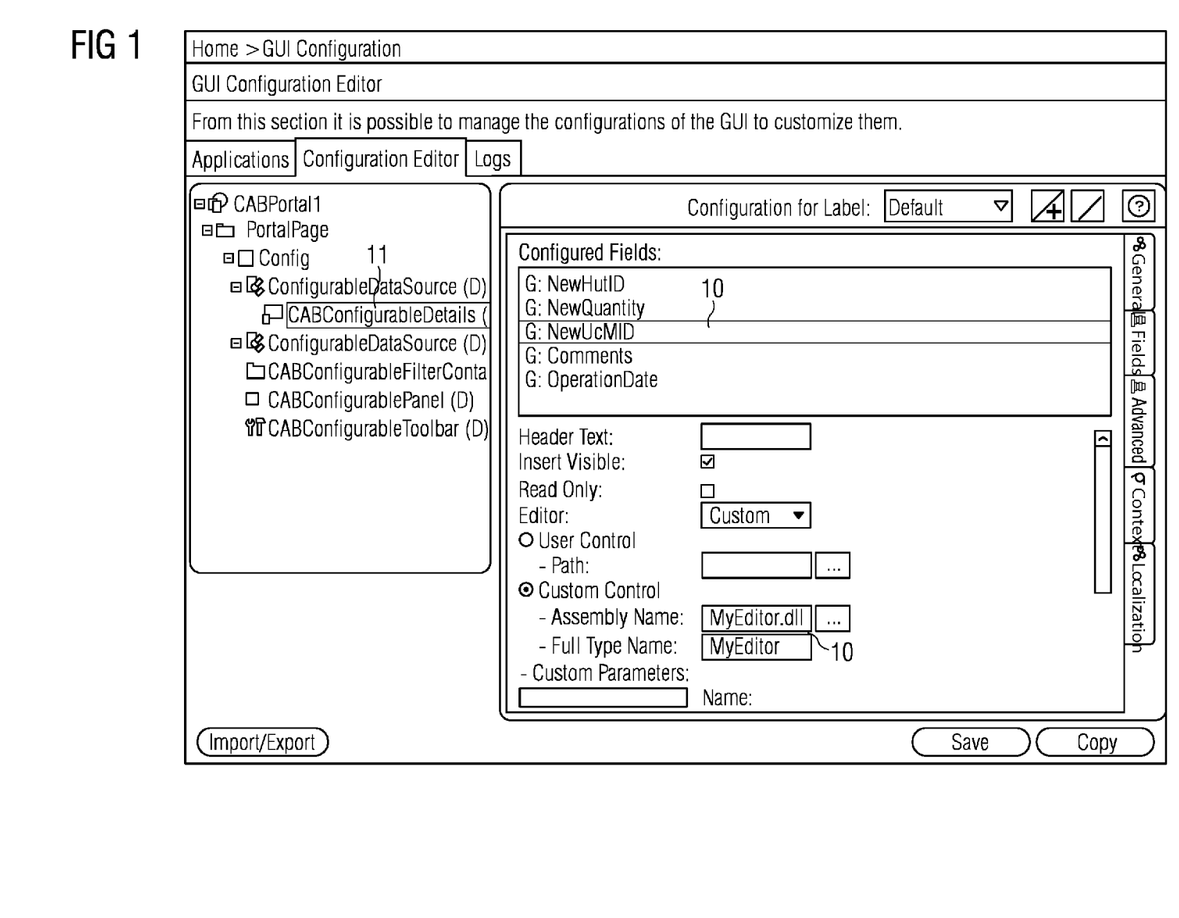
FIG. 1 is a snapshot example of a GUI configuration editor of the GUI configuration tool, according to the first exemplary embodiment of the present invention.

Referring now to the figures of the drawing in detail and first, particularly, to FIG. 1 thereof, there is shown an exemplary screen shot of the configurator tool showing that it is possible to select a specific configurable operation input grid, e.g. "CabConfigurableDetails" 31, and specify that for the "Unit of Measure" field it is desired to use as input editor a specific ASP.net control developed by the system engineer, in this case a custom control. With the custom editor 30, to the newly developed ASP.net custom control "NewUoMID" it is assigned the assembly name myEditor.dll. The generation of this specific screen of the configuration tool is specified in the meta-data fixed structure which upon a call develops the specific page of the configuration tool.

According to a second embodiment of the present invention, through the configurable graphic control it may be advantageously possible to specify a custom procedure for adding detail information to a master/detail view in the GUI of the MES screen. For example, the type of the configurable graphic control may be tab type or panel type.

In this embodiment, a communication mechanism placed in the MES screen is preferably provided to allow at run time exchanging information between a configurable graphic control already present in the MES screen and the developed ASP.net control.

Figure 2:
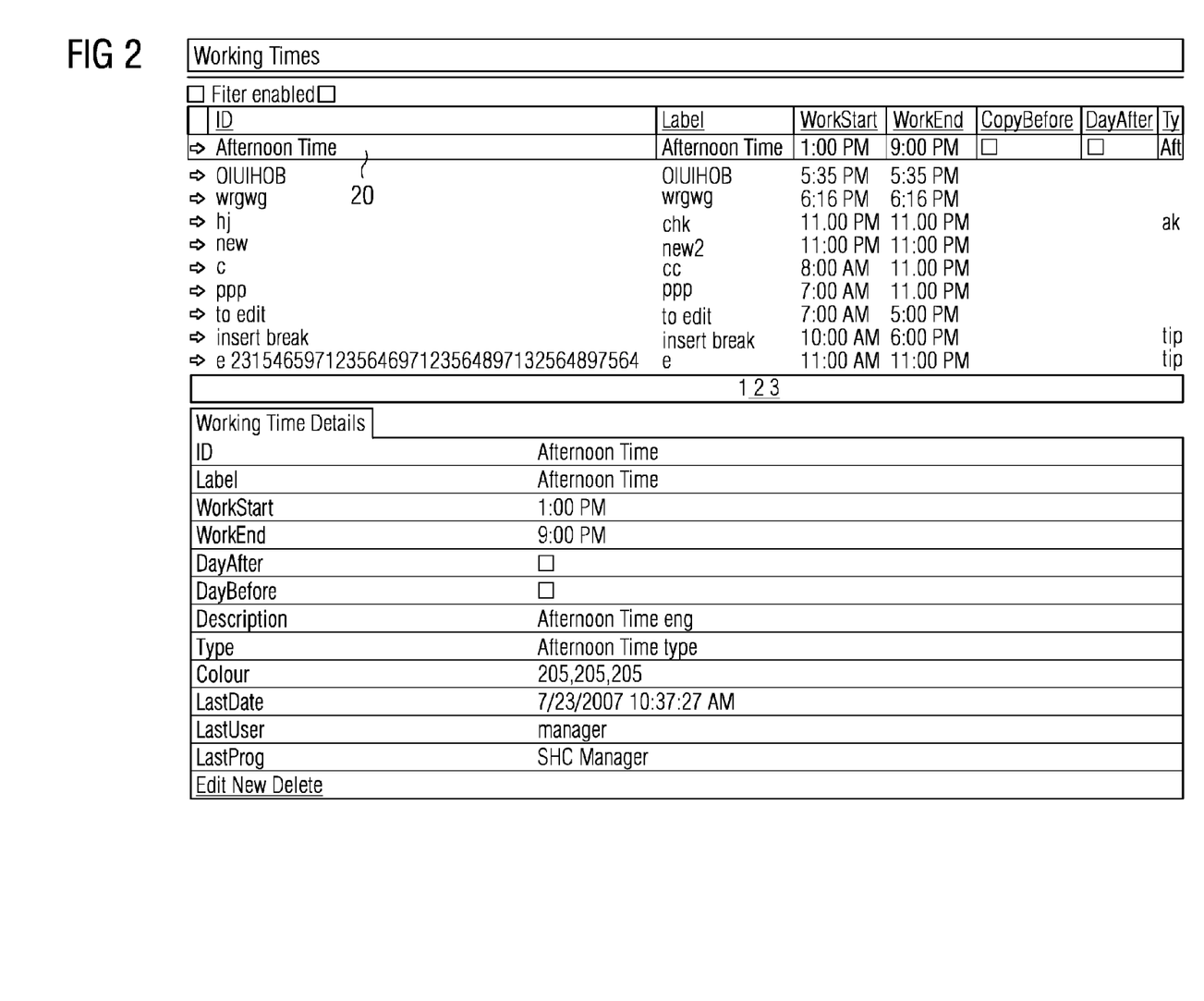
FIG. 2 is a snapshot example taken from a master grid with a set of MES entities in a page-screen GUI, delivered with a general purpose MES software product, according to a second exemplary embodiment of the present invention.

FIG. 2 is a snapshot example taken from a master grid with a set of MES entities in a GUI, delivered with a general purpose MES software product. Assuming that the customer wishes to improve the usability of this predefined MES screen by adding to it in a custom area one or more control that extends the original page, containing for instance some details about a selected entry on a master grid.

As shown in the snapshot of the master grid of FIG. 2, for the entity "Afternoon Time" 20, it is foreseen, upon selection, a detailing tab-panel called "Working Time Details" 21. Assuming that the system engineer wishes to improve the GUI, he can add in a custom area a custom control containing for instance some details about a selected entry on a master grid. For example, in this specific example, the system engineer wishes to add a new detailing tab-panel providing other detailing information about the selected entry on the master grid, e.g. by adding a tab-panel called "Breaks" 30 containing break details on the same selected entry "Afternoon Time" 20 of the master grid.

Figure 3:
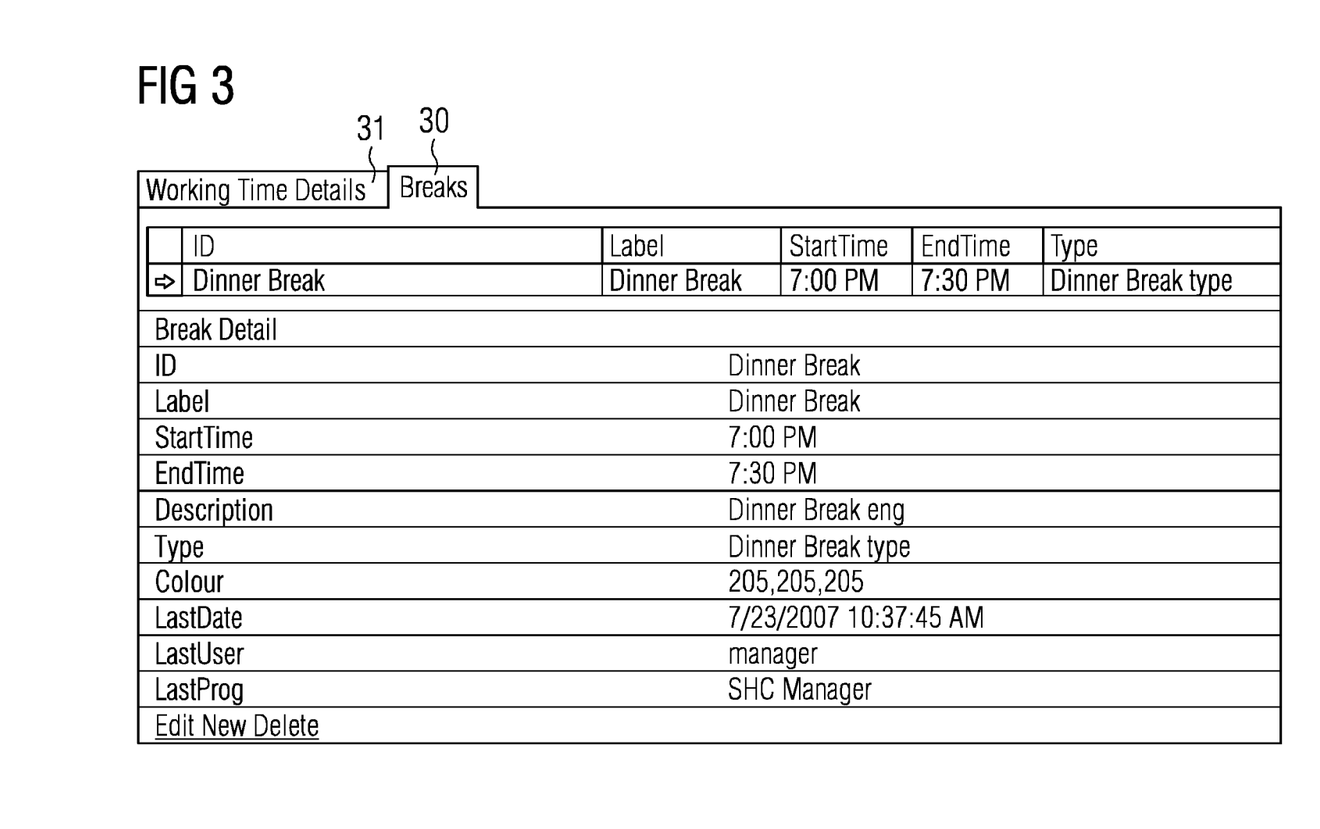
FIG. 3 is a snapshot example of the tab-control containing a tab-panel called "Break Detail" with some detail information in form of records according to the second embodiment of the present invention.
Figure 4:
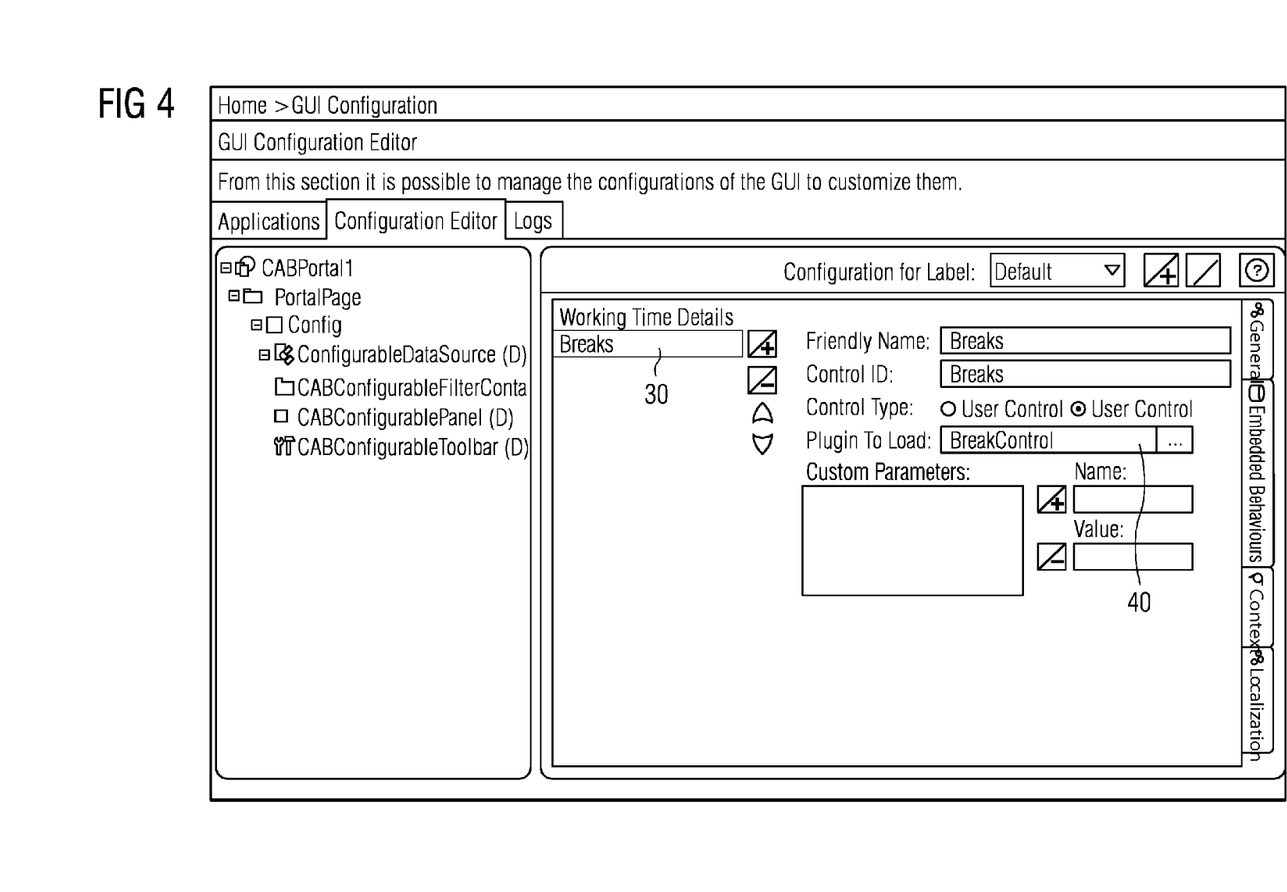
FIG. 4 is snapshot example of a GUI configuration editor of the GUI configuration tool, according to the second example embodiment of the present invention.

FIG. 3 shows a snapshot example of the tab-control containing a tab-panel called "Breaks" with some break detail information in form of records. The customization shown in FIG. 3 is implemented, according to the present invention, through the dynamically built GUI configuration tool. FIG. 4 shows a snapshot example of a second GUI configuration editor of the GUI configuration tool, according to the second example embodiment of the present invention.

For this specific example, as shown in FIG. 4, from the GUI configuration tool it is possible to add, to the configurable graphic tab control, a tab panel called "Breaks" 30 and to specify to load a specific ASP.net control developed by the system engineer, in this case to a user control called "BreakControl" 40. With the custom editor shown in FIG. 4, to the ASP.net user control 40 it is assigned the user friendly name and control ID "Breaks".

In the context of the present invention, it is essential to the MES user that he is enabled to use the configuration tool which is dynamically built. In order to build the configuration tool, same actions have been taken at engineering level in the "back office". Determining at least one set of specification data in a configuration file is a pre-requisite that the configuration tool finds a basis to be built upon. Said set of specification data has a meta-data fixed structure enabling the generation of a configuration interface as shown in FIGS. 1 and 4 according to a predefined structure. Said specification data for example determines which controls can be selected, which data graphs might be displayed and so on. Now by executing the dynamically built and WEB technology based GUI configuration tool, wherein the GUI configuration tool calls the specification data in the configuration file and offers the user the configuration interface within said GUI configuration tool in order to create the graphical user interface according to the specification data. Therefore, the specification data and its pre-defined meta-data fixed structure already determine the appearance of the configuration interface. Generating by use of the meta-data fixed structure the configuration interface is the logical consequence of the concept of the determined meta-data fixed structure. The MES user then creates by the selections he enters in the graphical configuration interface the GUI thereby determining the appearance of the respective data fields in the graphical user interface. On the run, the data fields in the GUI are then filled with the respective data stemming from the production process. Therefore, the meta-data fixed structure represents the links among the data fields in the GUI and the effective storage position of this data in the MES database. Whenever now the structure of the MES database changes, these changes have only to be reflected in the meta-data fixed structure. No manual intervention is required to align the data fields in the GUI to the respective data in the MES database which forms a significant advantage over the prior art situation.

The invention claimed is:

1. A method for creating a graphical user interface within a manufacturing execution system (MES), the method comprising:
 a) providing a client application builder tool (CAB) enabling a user to display MES screens and customize MES applications and/or proprietary applications by use of the graphical user interface, b) providing an MES database containing required data to be displayed on the MES screens;

c) storing data stemming from a production process controlled by the manufacturing executions system to the MES database;

d) determining at least one set of specification data in a configuration file, the set of specification data having a meta-data fixed structure enabling a generation of a configuration interface;

e) executing a dynamically built and WEB technology-based graphical user interface (GUI) configuration tool, wherein the GUI configuration tool calls the specification data in the configuration file and offers the user the configuration interface within the GUI configuration tool in order to create the graphical user interface according to the specification data, and wherein the graphical user interface configuration tool is built dynamically on the meta-data fixed structure that represents the links between data fields in a graphical user interface (GUI) and storage positions in the MES database in a way such that any change on the MES database will not affect an integrity of the graphical user interface;

f) generating the configuration interface by use of the meta-data fixed structure;

g) creating the graphical user interface according to data entries made to the configuration interface, thereby determining an appearance of respective data fields in the graphical user interface; and h) filling the data from the MES database into the respective data fields in the graphical user interface to thereby create the MES screens.

2. The method according to claim 1, wherein the data fields in the graphical user interface contain at least one of effective data values from resources contributing to the production process or graphs.

3. The method according to claim 1, wherein the data fields in the graphical user interface contain information selected from the group consisting of KPI data, drop-down lists, and user required data entries.

4. The method according to claim 1, wherein the manufacturing execution system is based on the S-95 standard.

5. The method according to claim 1, which comprises basing the structure of the graphical user interface on the meta-data fixed structure to thereby enable a virtual data link retrieving the data in the MES database to be displayed on the MES screen.

6. A non-transient computer-readable medium having a set of computer readable instructions stored thereon, the set of computer readable instructions for implementing a system for creating a graphical user interface within a manufacturing execution system (MES), the implemented system comprising:

a) a client application builder tool (CAB) enabling a user to display MES screens and customize MES applications and/or proprietary applications by use of the graphical user interface, b) an MES database containing required data to be displayed on the MES screens, wherein data stemming from a production process controlled by the manufacturing execution system are stored on said MES database;

c) at least one set of specification data in a configuration file, the set of specification data having a meta-data fixed structure enabling a generation of a configuration interface;

e) a dynamically built and WEB technology-based GUI configuration tool being executable, wherein said GUI configuration tool is configured to call the specification data in the configuration file and to offer the user the configuration interface within said GUI configuration tool in order to create the graphical user interface according to the specification data, and wherein the GUI configuration tool is built dynamically on the meta-data fixed structure that represents the links between data fields in a graphical user interface (GUI) and storage positions in the MES database in a way such that any change on the MES database will not affect an integrity of the graphical user interface;

f) a device for generating, by using the meta-data fixed structure, the configuration interface;

g) wherein the graphical user interface is created according to data entries made to the configuration interface thereby determining an appearance of the respective data fields in the graphical user interface; and h) the data from the MES database are filled into the respective data fields in the graphical user interface thereby creating the MES screens.

7. The non-transient computer-readable medium according to claim 6, wherein the data fields in the graphical user interface comprise effective data values from resources contributing to the production process and/or graphs.

8. The non-transient computer-readable medium according to claim 6, wherein the data fields in the graphical user interface comprise display information selected from the group consisting of KPI data, drop-down lists, and user required data entries.

9. The non-transient computer-readable medium according to claim 6, wherein the manufacturing execution system is based on the S-95 standard.

10. The non-transient computer-readable medium according to claim 6, wherein the structure of the graphical user interface is based on the meta-data fixed structure thereby enabling a virtual data link retrieving the data in the MES database to be displayed on the MES screen.

* * * * *